(12) United States Patent
Zhang et al.

(10) Patent No.: US 12,143,342 B2
(45) Date of Patent: Nov. 12, 2024

(54) TECHNIQUES FOR MANAGING SEMI-STATIC SCHEDULING OCCASION OVERWRITES

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 569 days.

(21) Appl. No.: 17/469,645

(22) Filed: Sep. 8, 2021

(65) Prior Publication Data

US 2023/0072920 A1 Mar. 9, 2023

(51) Int. Cl.
*H04L 5/14* (2006.01)
*H04B 7/0408* (2017.01)
*H04W 72/23* (2023.01)
*H04W 72/542* (2023.01)

(52) U.S. Cl.
CPC ......... *H04L 5/1461* (2013.01); *H04B 7/0408* (2013.01); *H04W 72/23* (2023.01); *H04W 72/542* (2023.01)

(58) Field of Classification Search
None
See application file for complete search history.

(56) References Cited

U.S. PATENT DOCUMENTS

| | | | |
|---|---|---|---|
| 2018/0287739 A1* | 10/2018 | Kim | H04J 11/0023 |
| 2019/0052450 A1* | 2/2019 | Fodor | H04L 5/1461 |
| 2019/0082335 A1* | 3/2019 | Yu | H04W 74/0833 |
| 2019/0140811 A1* | 5/2019 | Abedini | H04B 7/04 |
| 2019/0260485 A1* | 8/2019 | Byun | H04W 4/40 |
| 2019/0342898 A1* | 11/2019 | Nam | H04W 72/0446 |
| 2020/0169377 A1* | 5/2020 | Lee | H04W 56/0015 |
| 2020/0214018 A1* | 7/2020 | Venugopal | H04B 7/088 |
| 2020/0288479 A1* | 9/2020 | Xi | H04L 5/0094 |
| 2020/0374873 A1* | 11/2020 | Tiirola | H04W 72/23 |
| 2021/0021399 A1* | 1/2021 | Liu | H04L 1/0009 |
| 2021/0136768 A1* | 5/2021 | Kang | H04L 1/00 |
| 2021/0184812 A1* | 6/2021 | MolavianJazi | H04L 1/0041 |
| 2021/0218494 A1* | 7/2021 | Liu | H04B 7/15542 |
| 2021/0336680 A1* | 10/2021 | Park | H04B 7/088 |
| 2022/0069884 A1* | 3/2022 | Zhang | H04B 7/088 |
| 2022/0132533 A1* | 4/2022 | Taherzadeh Boroujeni | H04W 72/1268 |

(Continued)

Primary Examiner — Nicholas Sloms
(74) Attorney, Agent, or Firm — Patterson + Sheridan, LLP

(57) ABSTRACT

Certain aspects of the present disclosure provide techniques for communicating uplink and downlink transmissions when a semi-statically configured scheduling occasion is overwritten by a slot format indicator. A method performed by a user equipment (UE) includes receiving a control message from a base station (BS) activating a semi-static scheduling configuration, wherein the semi-static scheduling configuration indicates a plurality of configured grant (CG) symbols in which the UE is scheduled to transmit at least one uplink transmission to the BS. The method may further include receiving, from the BS, a slot format indicator (SFI) that overwrites a subset of CG symbols of the plurality of CG symbols to be downlink symbols, and taking one or more actions to communicate at least one downlink transmission in the downlink symbols.

22 Claims, 10 Drawing Sheets

(56) References Cited

U.S. PATENT DOCUMENTS

2023/0014238 A1* 1/2023 Pocovi ................... H04L 5/14
2023/0057994 A1* 2/2023 Elkotby ............ H04W 72/0453

* cited by examiner

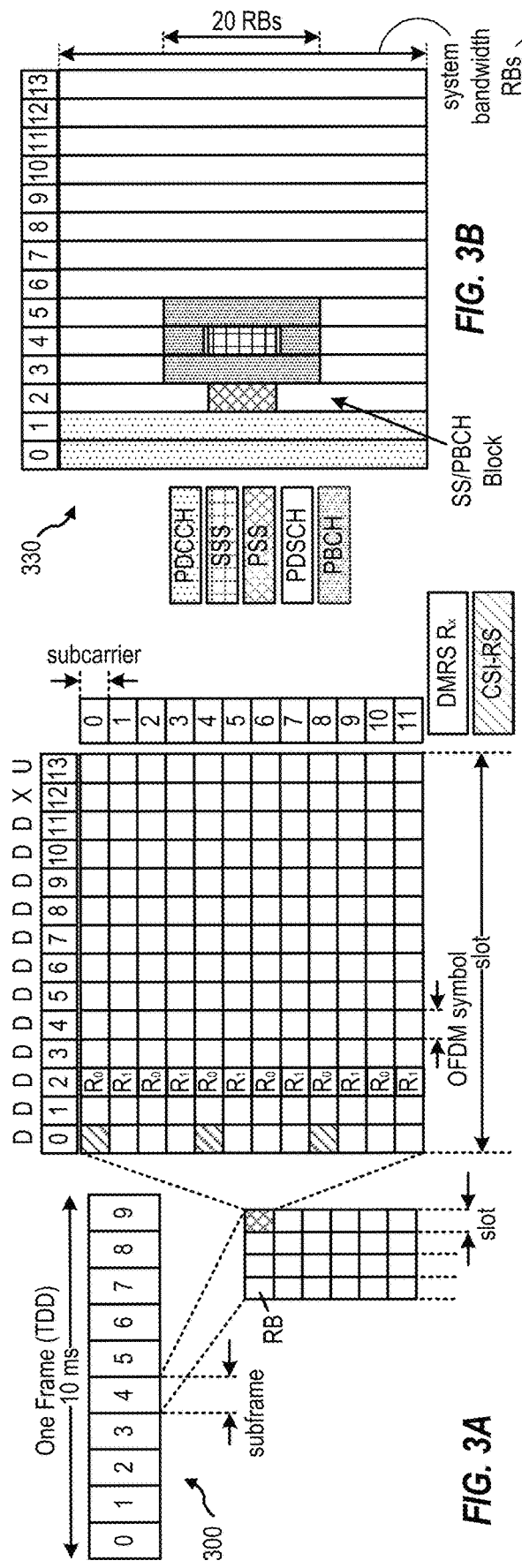
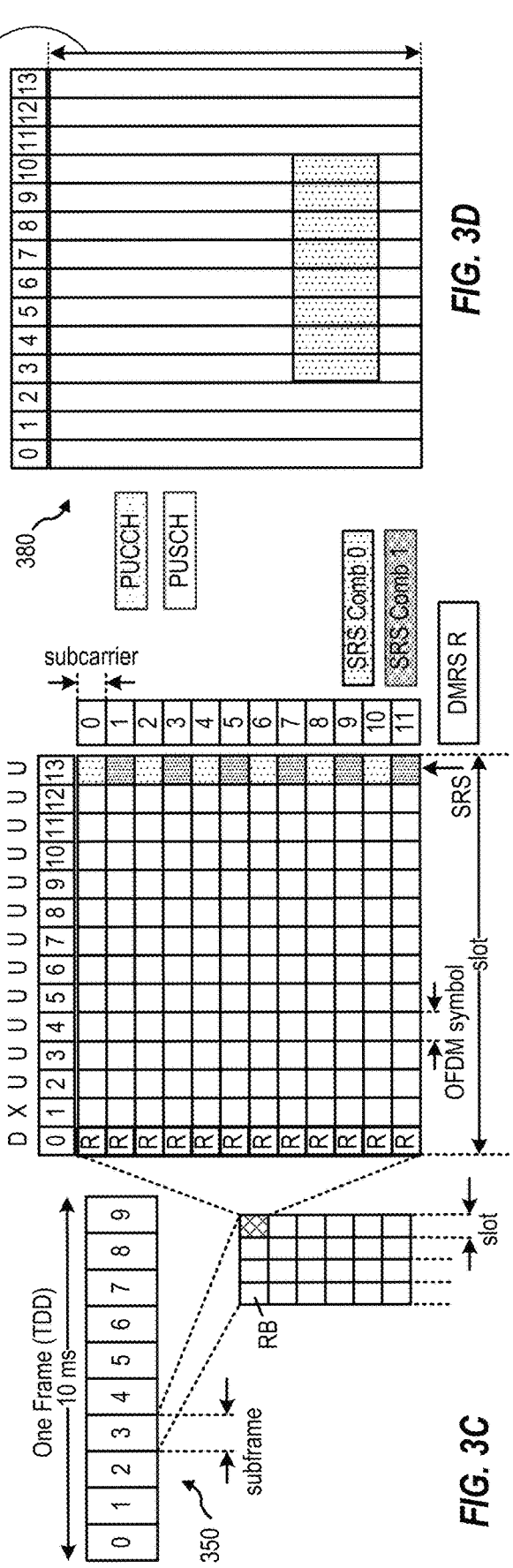

700

```
METHOD, PERFORMED BY A USER EQUIPMENT (UE), FOR
COMMUNICATING UPLINK AND DOWNLINK TRANSMISSIONS
WHEN A SEMI-STATICALLY CONFIGURED SCHEDULING
OCCASION IS OVERWRITTEN BY A SLOT FORMAT INDICATOR
```

710

RECEIVING A CONTROL MESSAGE FROM A BASE STATION (BS) ACTIVATING A SEMI-STATIC SCHEDULING CONFIGURATION, WHEREIN THE SEMI-STATIC SCHEDULING CONFIGURATION INDICATES A PLURALITY OF CONFIGURED GRANT (CG) SYMBOLS IN WHICH THE UE IS SCHEDULED TO TRANSMIT AT LEAST ONE UPLINK TRANSMISSION TO THE BS

720

RECEIVING, FROM THE BS, A SLOT FORMAT INDICATOR (SFI) THAT OVERWRITES A SUBSET OF CG SYMBOLS OF THE PLURALITY OF CG SYMBOLS TO BE DOWNLINK SYMBOLS

730

TAKING ONE OR MORE ACTIONS TO COMMUNICATE AT LEAST ONE DOWNLINK TRANSMISSION IN THE DOWNLINK SYMBOLS

METHOD, PERFORMED BY A BASE STATION (BS), FOR COMMUNICATING UPLINK AND DOWNLINK TRANSMISSIONS WHEN A SEMI-STATICALLY CONFIGURED SCHEDULING OCCASION IS OVERWRITTEN BY A SLOT FORMAT INDICATOR

— 810

TRANSMITTING A CONTROL MESSAGE TO A USER EQUIPMENT (UE) ACTIVATING A SEMI-STATIC SCHEDULING CONFIGURATION, WHEREIN THE SEMI-STATIC SCHEDULING CONFIGURATION INDICATES A PLURALITY OF CONFIGURED GRANT (CG) SYMBOLS IN WHICH THE UE IS SCHEDULED TO TRANSMIT AT LEAST ONE UPLINK TRANSMISSION TO THE BS

— 820

TRANSMIT, TO THE UE, A SLOT FORMAT INDICATOR (SFI) THAT OVERWRITES A SUBSET OF CG SYMBOLS OF THE PLURALITY OF CG SYMBOLS TO BE DOWNLINK SYMBOLS

— 830

COMMUNICATE AT LEAST ONE DOWNLINK TRANSMISSION IN THE DOWNLINK SYMBOLS

*FIG. 8*

TECHNIQUES FOR MANAGING SEMI-STATIC SCHEDULING OCCASION OVERWRITES

INTRODUCTION

Aspects of the present disclosure relate to wireless communications, and more particularly, to techniques for managing scenarios during full duplex communication in which a scheduling occasion is overwritten.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method for wireless communication performed by a user equipment (UE). The method generally includes receiving a control message from a base station (BS) activating a semi-static scheduling configuration, wherein the semi-static scheduling configuration indicates a plurality of configured grant (CG) symbols in which the UE is scheduled to transmit at least one uplink transmission to the BS. In some cases, the method further includes receiving, from the BS, a slot format indicator (SFI) that overwrites a subset of CG symbols of the plurality of CG symbols to be downlink symbols and taking one or more actions to communicate at least one downlink transmission in the downlink symbols.

Certain aspects can be implemented in an apparatus for wireless communication. The apparatus includes a memory comprising executable instructions and one or more processors configured to execute the executable instructions and cause the apparatus to: receiving a control message from a base station (BS) activating a semi-static scheduling configuration, wherein the semi-static scheduling configuration indicates a plurality of configured grant (CG) symbols in which the apparatus is scheduled to transmit at least one uplink transmission to the BS. In some cases, the one or more processors are further configured to cause the apparatus to receive, from the BS, a slot format indicator (SFI) that overwrites a subset of CG symbols of the plurality of CG symbols to be downlink symbols and take one or more actions to communicate at least one downlink transmission in the downlink symbols.

Certain aspects can be implemented in an apparatus for wireless communication. The apparatus includes means for receiving a control message from a base station (BS) activating a semi-static scheduling configuration, wherein the semi-static scheduling configuration indicates a plurality of configured grant (CG) symbols in which the apparatus is scheduled to transmit at least one uplink transmission to the BS. In some cases, the apparatus also includes means for receiving, from the BS, a slot format indicator (SFI) that overwrites a subset of CG symbols of the plurality of CG symbols to be downlink symbols and means for taking one or more actions to communicate at least one downlink transmission in the downlink symbols.

Certain aspects can be implemented in a non-transitory computer-readable medium for wireless communication. The non-transitory computer-readable medium comprises executable instructions that, when executed by one or more processors of an apparatus, cause the apparatus to: receive a control message from a base station (BS) activating a semi-static scheduling configuration, wherein the semi-static scheduling configuration indicates a plurality of configured grant (CG) symbols in which the apparatus is scheduled to transmit at least one uplink transmission to the BS. In some cases, the non-transitory computer-readable medium further includes executable instructions that cause the apparatus to receive, from the BS, a slot format indicator (SFI) that overwrites a subset of CG symbols of the plurality of CG symbols to be downlink symbols and take one or more actions to communicate at least one downlink transmission in the downlink symbols.

Certain aspects can be implemented in a computer program product for wireless communication by a user equipment (UE). The computer program product may be embodied on a computer-readable storage medium and may comprise code for: receiving a control message from a base station (BS) activating a semi-static scheduling configuration, wherein the semi-static scheduling configuration indicates a plurality of configured grant (CG) symbols in which the UE is scheduled to transmit at least one uplink transmission to the BS. In some cases, the computer program product further includes code for receiving, from the BS, a slot format indicator (SFI) that overwrites a subset of CG symbols of the plurality of CG symbols to be downlink symbols and code for taking one or more actions to communicate at least one downlink transmission in the downlink symbols.

Certain aspects can be implemented in a method for wireless communication performed by a base station (BS). The method generally includes transmitting a control message to a user equipment (UE) activating a semi-static scheduling configuration, wherein the semi-static scheduling configuration indicates a plurality of configured grant (CG) symbols in which the UE is scheduled to transmit at least one uplink transmission to the BS. In some cases, the method further includes transmitting, to the UE, a slot format indicator (SFI) that overwrites a subset of CG symbols of the plurality of CG symbols to be downlink symbols and communicating at least one downlink transmission in the downlink symbols.

Certain aspects can be implemented in an apparatus for wireless communication. The apparatus includes a memory comprising executable instructions and one or more processors configured to execute the executable instructions and cause the apparatus to: transmit a control message to a user equipment (UE) activating a semi-static scheduling configuration, wherein the semi-static scheduling configuration indicates a plurality of configured grant (CG) symbols in which the UE is scheduled to transmit at least one uplink transmission to the apparatus. In some cases, the one or more processors are further configured to transmit, to the UE, a slot format indicator (SFI) that overwrites a subset of CG symbols of the plurality of CG symbols to be downlink symbols and communicate at least one downlink transmission in the downlink symbols.

Certain aspects can be implemented in an apparatus for wireless communication. The apparatus includes means for transmitting a control message to a user equipment (UE) activating a semi-static scheduling configuration, wherein the semi-static scheduling configuration indicates a plurality of configured grant (CG) symbols in which the UE is scheduled to transmit at least one uplink transmission to the apparatus. In some cases, the apparatus further includes means for transmitting, to the UE, a slot format indicator (SFI) that overwrites a subset of CG symbols of the plurality of CG symbols to be downlink symbols and means for communicating at least one downlink transmission in the downlink symbols.

Certain aspects can be implemented in a non-transitory computer-readable medium for wireless communication. The non-transitory computer-readable medium comprises executable instructions that, when executed by one or more processors of an apparatus, cause the apparatus to: transmit a control message to a user equipment (UE) activating a semi-static scheduling configuration, wherein the semi-static scheduling configuration indicates a plurality of configured grant (CG) symbols in which the UE is scheduled to transmit at least one uplink transmission to the apparatus. In some cases, the non-transitory computer-readable medium further includes instructions that cause the apparatus to transmit, to the UE, a slot format indicator (SFI) that overwrites a subset of CG symbols of the plurality of CG symbols to be downlink symbols and communicate at least one downlink transmission in the downlink symbols.

Certain aspects can be implemented in a computer program product for wireless communication by a base station (BS). The computer program product may be embodied on a computer-readable storage medium and may comprise code for: transmitting a control message to a user equipment (UE) activating a semi-static scheduling configuration, wherein the semi-static scheduling configuration indicates a plurality of configured grant (CG) symbols in which the UE is scheduled to transmit at least one uplink transmission to the BS. In some cases, the computer program product further includes code for transmitting, to the UE, a slot format indicator (SFI) that overwrites a subset of CG symbols of the plurality of CG symbols to be downlink symbols and code for communicating at least one downlink transmission in the downlink symbols The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIG. 7 is a flow diagram illustrating example operations for wireless communication by a user equipment.

FIG. 8 is a flow diagram illustrating example operations for wireless communication by a base station.

DETAILED DESCRIPTION

Figure 1:
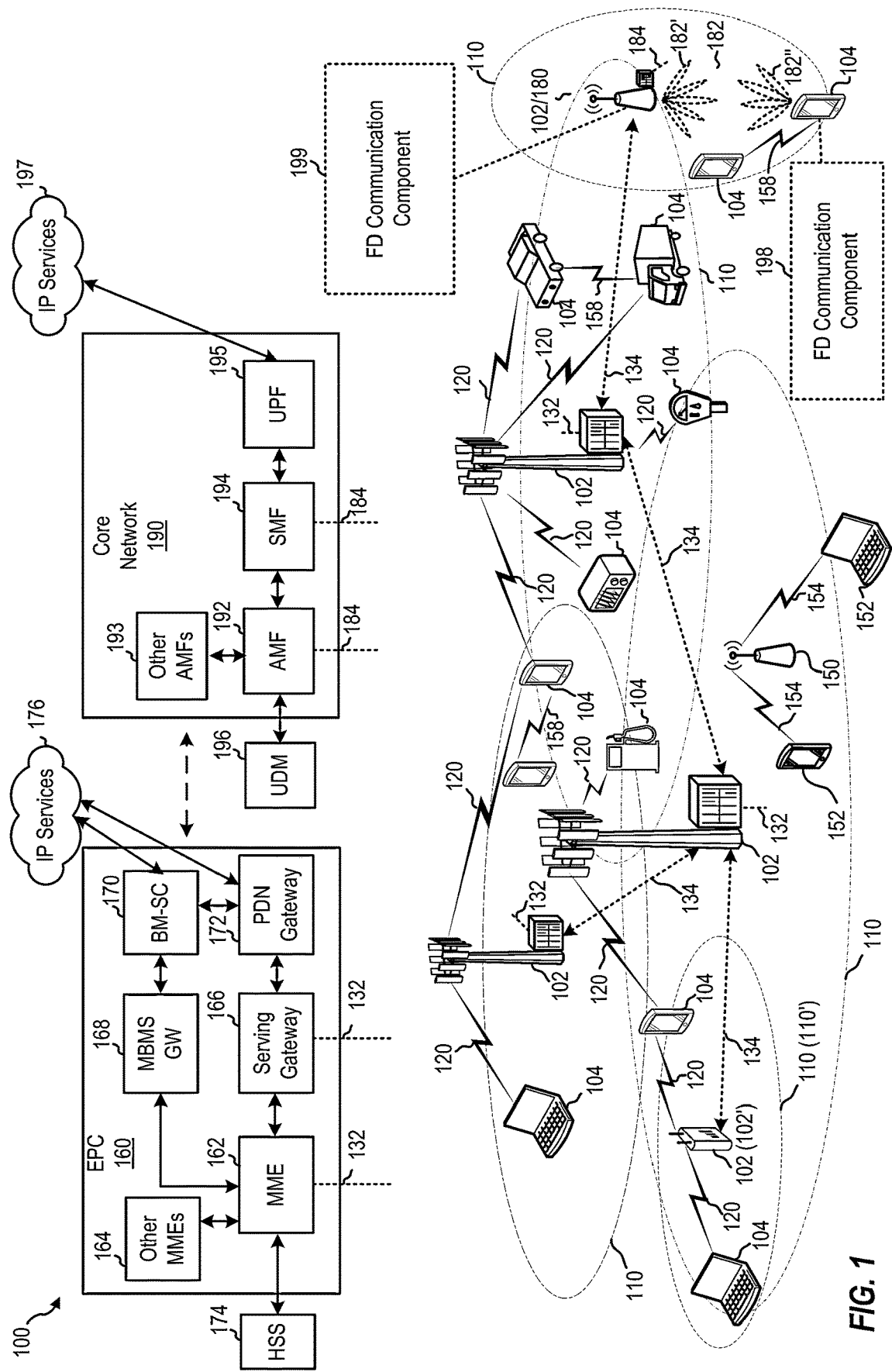
FIG. 1 is a block diagram conceptually illustrating an example wireless communication network.

Aspects of the present disclosure provide apparatuses, methods, processing systems, and computer-readable mediums for communicating uplink and downlink transmissions in a wireless network when a semi-statically configured scheduling occasion is overwritten by a slot format indicator (SFI).

Wireless communications devices, such as UEs, may communicate using time resources within a slot, known as symbols. In some cases, an SFI may be used to indicate to the UE which symbols within the slot are downlink symbols, which symbols within the slot are uplink symbols, and which symbols within the slot are flexible symbols. UEs may be scheduled to communicate transmissions within the symbols of a slot in different manners. For example, in some cases, UEs may be configured with semi-static resources, known as configured grant (CG) occasions, for transmitting uplink transmissions in uplink symbols of a slot. These semi-static resources are time and frequency resources for transmitting the uplink transmissions that are associated with a defined periodicity and duration. In other words, when configured with semi-static resources, the UE may be configured to transmit the uplink transmissions according to a defined periodicity and for a defined duration.

In some cases, there may be instances where a base station sends an SFI to a UE that overwrites an uplink symbol and CG occasion, in which the UE intends to perform an uplink transmission in a slot, to be a downlink symbol. In such cases, because the uplink symbol and CG occasion are overwritten to be a downlink symbol, the UE may cancel the uplink transmissions within the uplink symbols and CG occasions that were overwritten by the SFI. In certain devices, such as UEs that are capable of FD communication, this dropping or canceling of the uplink transmissions in the CG occasions may be unnecessary, leading to extended transmission latency and poor user experience.

Accordingly, aspects of the present disclosure provide techniques for managing situations in which a subset of CG symbols (e.g., a symbol of a slot in which a UE is scheduled to perform an uplink transmission) of a slot are overwritten to be downlink symbols. For example, as will be described in greater detail below, in these situations, a UE may either decide to drop at least one uplink transmission occurring in the subset of CG symbols or may decide to transmit the at least one uplink transmission in the subset of CG symbols simultaneously with receiving at least one downlink transmission using FD communication. In some cases, using FD communication to simultaneously transmit the at least one uplink transmission and the at least one downlink transmission may reduce transmission latency and improve user experience. Additionally, simultaneously receiving downlink transmissions and transmitting the at least one uplink transmission in the subset of CG symbols allows for more-efficient use of time and frequency resources within the wireless network and improves overall data throughput within the network.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BS 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Figure 6:
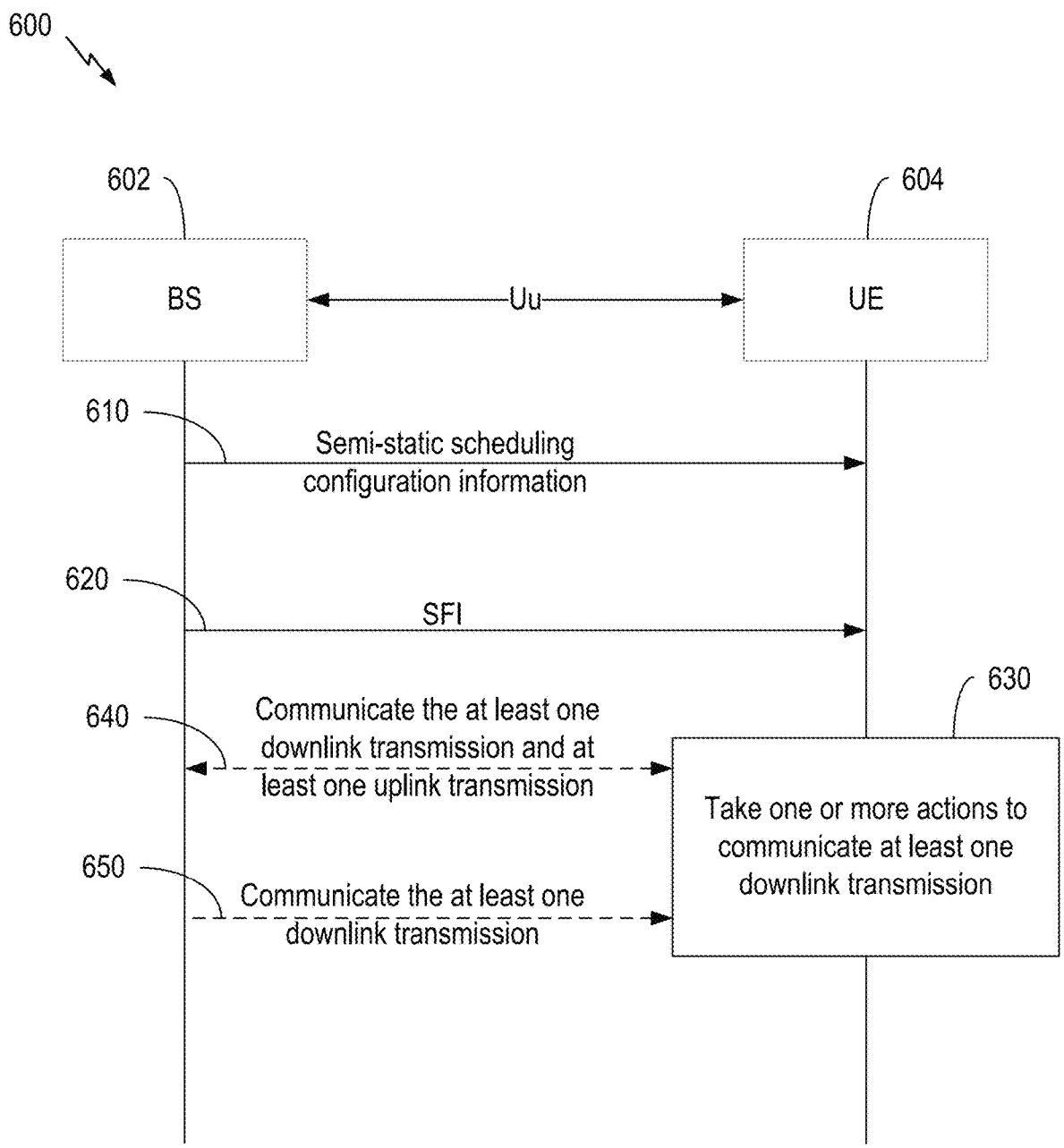
FIG. 6 is a call flow diagram illustrating example operations between a base station and a user equipment for communicating uplink and downlink transmissions when a semi-statically configured scheduling occasion is overwritten by a slot format indicator.

Wireless communication network 100 includes a FD communication component 199, which may be configured to perform the operations illustrated in one or more of FIG. 6 or 8, as well as other operations described herein for communicating uplink and downlink transmissions when a semi-statically configured scheduling occasion is overwritten by a slot format indicator. Wireless communication network 100 further includes FD communication component 198, which may be configured to perform the operations illustrated in one or more of FIGS. 6-7, as well as other operations described herein for communicating uplink and downlink transmissions when a semi-statically configured scheduling occasion is overwritten by a slot format indicator.

Figure 2:
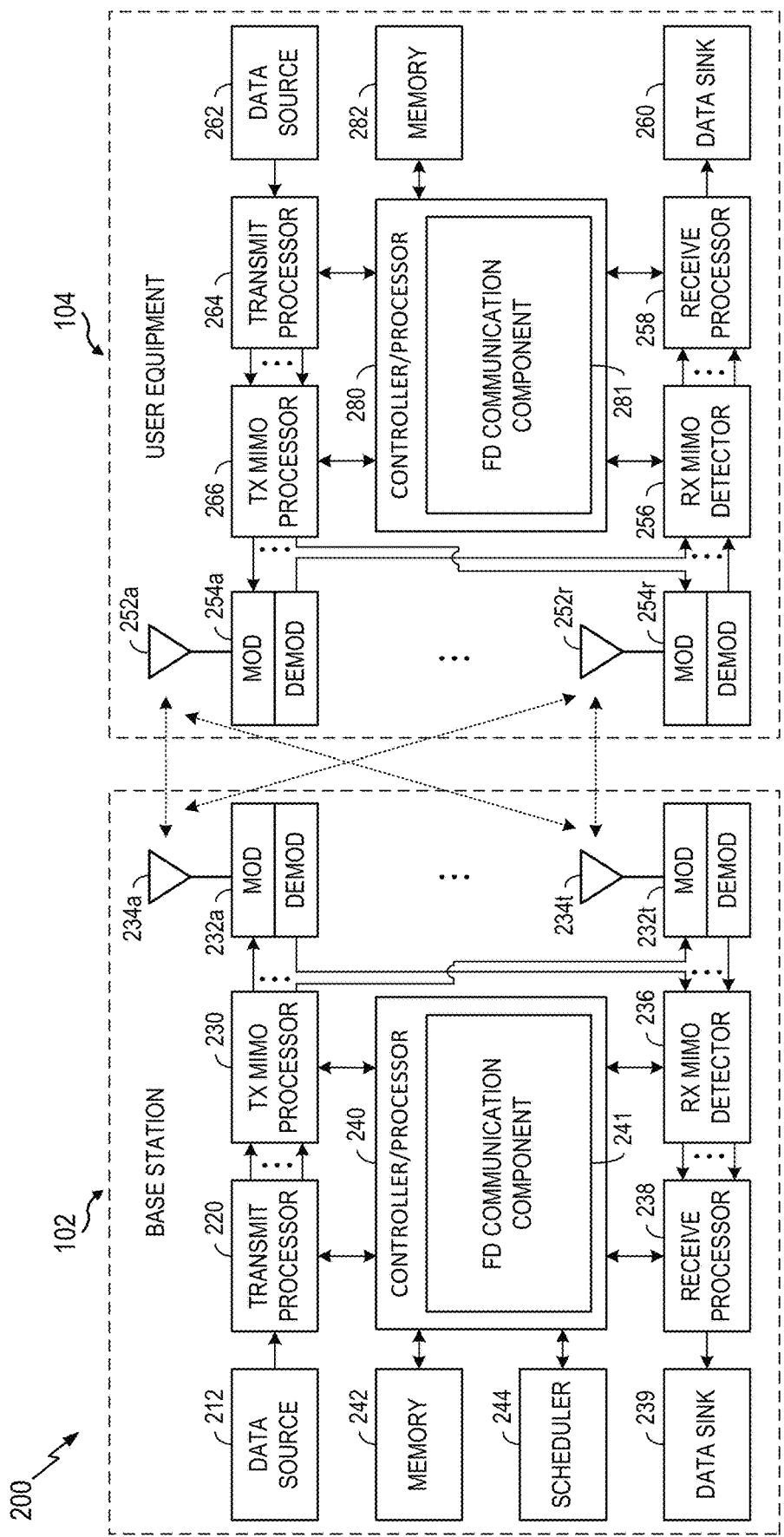
FIG. 2 is a block diagram conceptually illustrating aspects of an example a base station and user equipment.

FIG. 2 depicts aspects of an example BS 102 and a UE 104.

Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes FD communication component 241, which may be representative of FD communication component 199 of FIG. 1. Notably, while depicted as an aspect of controller/processor 240, FD communication component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes FD communication component 281, which may be representative of FD communication component 198 of FIG. 1. Notably, while depicted as an aspect of controller/processor 280, FD communication component 281 may be implemented additionally or alternatively in various other aspects of UE 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5G networks may utilize several frequency ranges, which in some cases are defined by a standard, such as the 3GPP standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (e.g., 180) configured to communicate using mmWave/near mmWave radio frequency bands may utilize beamforming (e.g., 182) with a UE (e.g., 104) to improve path loss and range.

Introduction to Multi Antenna Panel Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

Introduction to Full Duplex and Half Duplex Communication

As noted above, in some cases, wireless communication devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 4A:
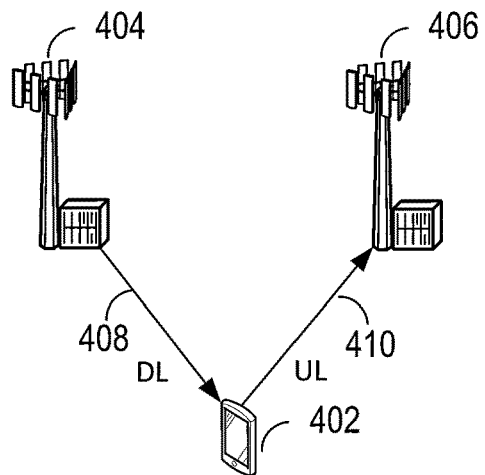
FIGS. 4A-4C illustrates different full-duplex use cases within a wireless communication network.
Figure 4B:
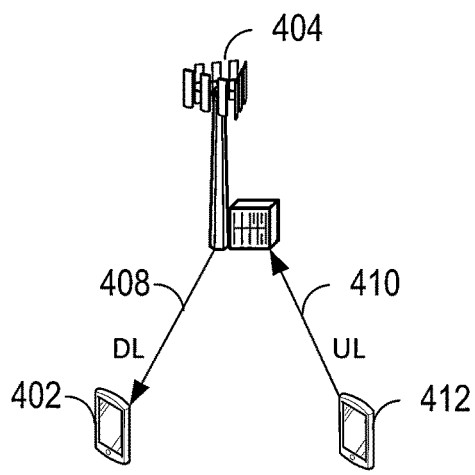
Figure 4C:
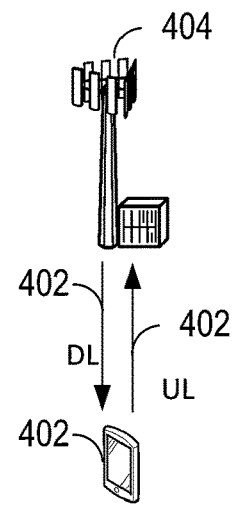

FIGS. 4A-4C illustrates different FD use cases within a wireless communication network, such as the wireless communication network 100. For example, FIG. 4A illustrates a first FD use case involving transmission between one UE 402 and two base stations (or multiple transmission reception points (mTRP)), BS 404 and BS 406. In some cases, UE 402 may be representative of UE 104 of FIG. 1 and BSs 404, 406 may be representative of BS 102 of FIG. 1. As shown, the UE 402 may simultaneously receive DL transmissions 408 from the BS 404 and transmit UL transmissions 410 to the BS 406. In some cases, the DL transmissions 408 and UL transmissions 410 may be performed using different antenna panels to facilitate the simultaneous transmission and reception.

A second FD use case is illustrated in FIG. 4B involving two different UEs and one BS. As illustrated, the UE 402 may receive DL transmissions 408 from the BS 404 while another UE 412 may simultaneously transmit UL transmission 410 to the BS 404. Thus, in this example, BS 404 is conducting simultaneous uplink and downlink communications.

A third FD use case is illustrated in FIG. 4C involving one BS and one UE. As illustrated, the UE 402 may receive DL transmissions 408 from the BS 404 and may simultaneously transmit UL transmissions 410 to the BS 404. As noted above, such simultaneous reception/transmission by the UE 402 may be facilitated by different antenna panels.

Table 1, below, illustrates various example scenarios in which each of the FD use cases may be used.

TABLE 1

| Base Station | UE | FD use case |
| --- | --- | --- |
| FD disabled | FD disabled | Baseline R-15/16 5G behavior |
| FD disabled | FD enabled | Use case #1 (FIG. 4A) for mTRP |
| FD enabled | FD disabled | Use case #2 (FIG. 4B) + R-16 IAB |
| FD enabled | FD enabled | Use case #3 (FIG. 4C) |

As shown in Table 1, if FD capability is disabled at both the base station and UE, the baseline R-15 and R-16 5G behavior may be used (e.g., HD communication). If FD capability is disabled at the BS but enabled at the UE, the UE may operate according to the first example FD use case shown in FIG. 4A in which the UE may communicate with two different TRPs simultaneously (e.g., simultaneous UL and DL transmissions) using two different antenna panels. If FD is enabled at the BS but disabled at the UE (e.g., the UE is not capable of FD), the BS may operate according to the second example FD use case shown in FIG. 4B in which the BS may communicate with two different UEs simultaneously (e.g., simultaneous UL and DL transmissions) using two different antenna panels. Finally, if FD is enabled at both the BS and the UE, the BS and UE may operate according to the third example FD use case shown in FIG. 4C in which the BS and UE may communicate with each other simultaneously on the UL and DL, each of the BS and UE using different antenna panels for UL and DL transmissions.

FD communication may be facilitated through the use of frequency division multiplexing (FDM) or spatial division multiplexing (SDM). In FDM, the simultaneous UL and DL transmissions may be transmitted in the same time resources but on separate frequency bands separated by some guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Figure 5:
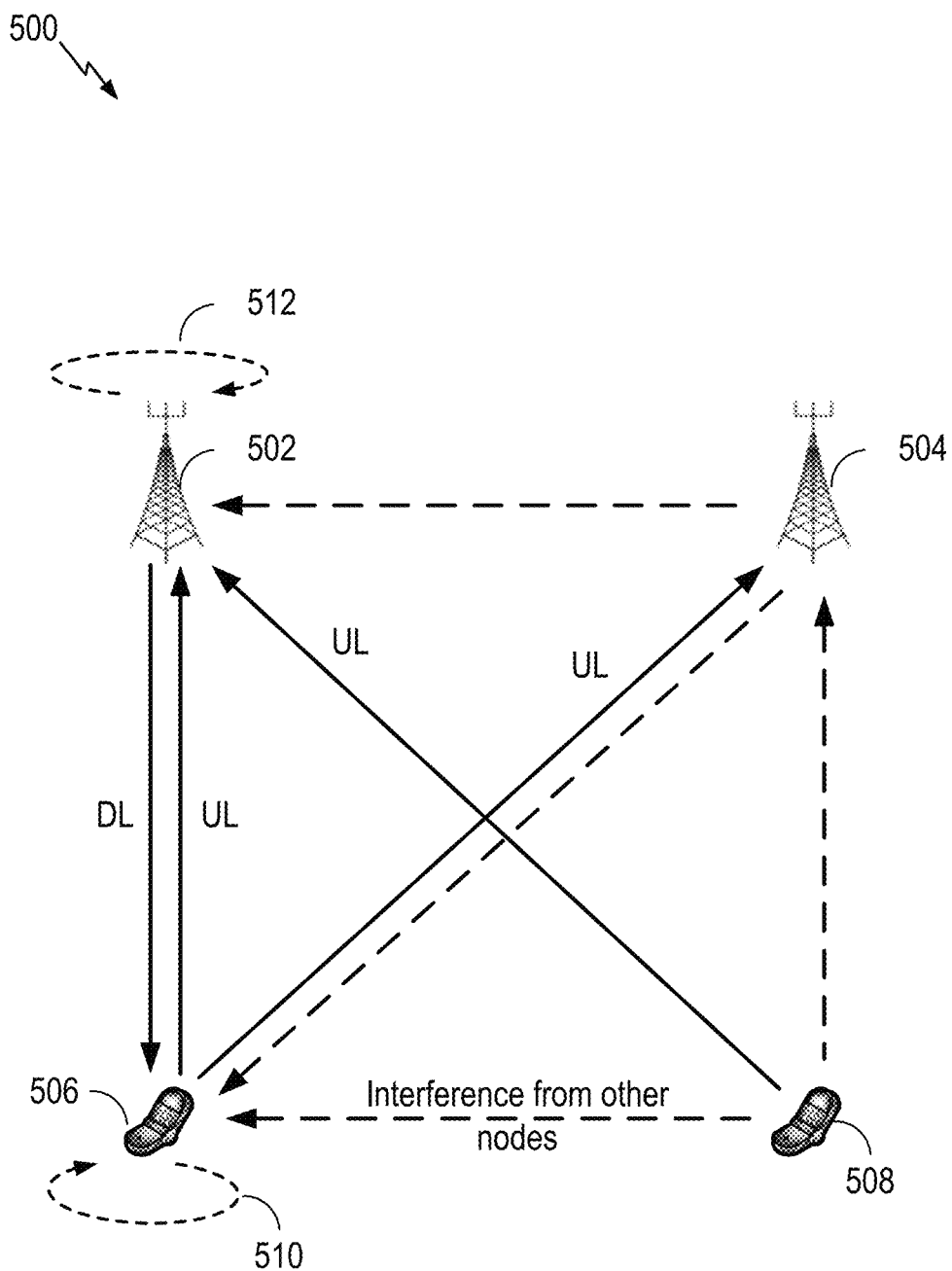
FIG. 5 illustrates interference scenarios that may occur within a wireless communications network.

As noted above, FD communication provides for reduced transmission and reception latency and increased spectrum efficiency; however, wireless communications devices that use FD communication may still be susceptible to certain interferences, such as self-interferences caused between antenna panels used for uplink and downlink transmissions. Similarly, wireless communications devices that are capable of using FD communication may also be susceptible to interference from neighboring wireless communications devices. FIG. 5 illustrates interference scenarios that may occur within a wireless communications network 500 in which FD and HD communications may be used. In some cases, the wireless communications network 400 may be an example of the wireless communications network 100 of FIG. 1.

As shown in FIG. 5, wireless communication may occur between a plurality of wireless communication devices, such as BS 502, BS 504, UE 506, and UE 508. In some cases, BS 502 and UE 506 may be capable of FD communication while BS 504 and UE 508 may only be capable of HD communication. As such, HD and FD communication may be intermixed in the wireless communication network 400. Such intermixed HD and FD communication may include communication between an FD UE and an HD BS (e.g., UE 506 and BS 504), between an FD BS and an HD UE (e.g., BS 502 and UE 508), and between an FD BS and an FD UE (e.g., BS 502 and UE 506).

In some cases, as noted above, wireless communications devices that are capable of using FD communication, such as BS 502 and UE 506, may be susceptible to interference from neighboring wireless communications devices. In the example illustrated in FIG. 5, FD-capable UE 506 may be susceptible to interference from neighboring UE 508 as well as neighboring BS 504. Similarly, in the example illustrated in FIG. 5, FD-capable BS 502 may be susceptible to interference from neighboring BS 504.

Moreover, FD-capable BS 502 and FD-capable UE 506 may also be susceptible to self-interference between antenna panels used for FD communication. For example, as illustrated, UE 506 may experience self-interference 510 between antenna panels used for FD communication with the BS 502 and/or BS 504. More specifically, for example, the UE 506 may experience self-interference 510 between an antenna panel used for receiving downlink transmissions from the BS 502 and an antenna panel used for transmitting uplink transmissions to the BS 502 and/or BS 504. Similarly, the BS 502 may experience self-interference 512 between an antenna panel used for receiving uplink transmissions from the UE 506 and an antenna panel used for transmitting downlink transmissions the UE 506.

This self-interference that may be experienced by wireless communications devices that are capable of FD communication is undesirable and can lead to negative effects. These negative effects may include transmissions that cannot be properly received or decoded, which may lead to wasted time and frequency resources within the wireless communication network 500, as well as wasted power resources at a transiting device and receiving device, associated with having to retransmit/re-receive the transmissions that were not previously properly received/decoded due to the self-interference between antenna panels.

Aspects Related to Managing Configured Grant Occasion Overwrites

Wireless communications devices, such as UEs, may communicate using time resources within a slot, known as symbols. In some cases, symbols within the slot may be classified as downlink, flexible, or uplink. Flexible symbols may be configured either for uplink or for downlink transmissions and may be used to handle a guard period that allows a transceiver of the UE to switch between downlink and uplink and to allow for timing advance in the uplink. In some cases, a slot format indicator (SFI) may be used to indicate to the UE which symbols within a slot are downlink symbols, which symbols within the slot are uplink symbols, and which symbols within the slot are flexible symbols. An example of these downlink symbols, uplink symbols, and flexible is illustrated in, and described in relation to, FIGS. 3A and 3C. The UE may use the SFI, as well as additional scheduling information, to determine a symbol in which to communicate (e.g., transmit and/or receive) transmission.

In some cases, UEs may be scheduled to communicate transmissions within the symbols of a slot in different manners. For example, in some cases, UEs may be scheduled using a dynamic grant. To schedule a UE using a dynamic grant, the base station may transmit control information, such as downlink control information (DCI), which includes the dynamic grant. The dynamic grant may include an indication of one or more time (e.g., symbols) and frequency resources for receiving a downlink transmission or transmitting an uplink transmission. In some cases, the one or more time and frequency resources may be non-periodic and may be allocated to the UE for a particular uplink/downlink transmission. As such, when another transmission needs to be scheduled for the UE, the base station may transmit another dynamic grant with additional scheduling information for this other transmission, which may increase overhead signaling.

In other cases, a semi-persistent scheduling (SPS) configuration may be used to schedule a UE with a set of semi-static time and frequency resources, known as SPS occasions, for periodically receiving downlink transmissions, such as transmissions on physical downlink shared channel (PDSCH). Configuring a UE with an SPS configuration that schedules a UE with a semi-static set of time and frequency resources for receiving PDSCH transmissions may minimize control overhead since control signaling only needs to be transmitted once to activate the SPS configuration and schedule the UE to receive the PDSCH transmissions in the periodic set of time and frequency resources.

SPS is also used in long-term evolution (LTE) for scheduling uplink transmissions for UEs, such as transmission of a physical uplink shared channel (PUSCH). However, the periodic set of time and frequency resources for SPS was usually dedicated to a single UE. As a result, if this single UE did not need certain resources in the periodic set of time and frequency resources for uplink transmissions, the resources that are unemployed by the UE were wasted. Accordingly, to reduce the waste of periodically allocated resources, Fifth Generation (5G) New Radio (NR) enables multiple UEs to share a periodic set of time and frequency resources, known a configured grant (CG) occasions or CG resources. For example, a base station may transmit a CG configuration that allocates the CG occasions/resources to multiple UEs, and the UEs may randomly utilize the resources when they have data to transmit. By assigning the CG resources, the base station may eliminate packet transmission delay for a scheduling request procedure associated with scheduling uplink transmissions and increases a utilization ratio of allocated periodic time and frequency resources.

Generally, when communicating using CG resources, a UE may use one or more uplink symbols within a slot, such as uplink symbols 2-13 illustrated in FIG. 3C. As noted above, these uplink symbols may be indicated to the UE by a received SFI from a base station. However, there may be instances where the base station sends an SFI to the UE that overwrites an uplink symbol and CG occasion, in which the UE intends to perform an uplink transmission in the slot, to be a downlink symbol. For example, with reference to FIG. 3C, in some cases, the SFI may overwrite uplink symbol #5 (and CG occasion within this symbol) to be a downlink symbol. In such cases, because the uplink symbol and CG occasion are overwritten to be a downlink symbol, the UE may cancel the uplink transmissions within the uplink symbols and CG occasions that were overwritten by the SFI. The UE may then use a default downlink receive beam to receive downlink transmissions from base station within the overwriting downlink symbol (if scheduled).

In certain devices, such as UEs that are capable of FD communication, this dropping or canceling of the uplink transmissions in the CG occasions may be unnecessary, leading to extended transmission latency and poor user experience. Accordingly, aspects of the present disclosure provide techniques for managing situations in which a subset of CG symbols (e.g., a symbol of a slot in which a UE is scheduled to perform an uplink transmission) of a slot are overwritten to be downlink symbols. For example, as will be described in greater detail below, in these situations, a UE may either decide to drop at least one uplink transmission occurring in the subset of CG symbols or may decide to use FD communication to transmit the at least one uplink transmission in the subset of CG symbols simultaneously with receiving at least one downlink transmission using FD communication. In some cases, using FD communication to simultaneously transmit the at least one uplink transmission and the at least one downlink transmission may reduce transmission latency and improve user experience.

Example Call Flow Illustrating Operations for Managing Configured Grant Overwrites FIG. 6 is a call flow diagram illustrating example operations 600 between a BS 602 and a UE 604 for managing situations where a CG occasion is overwritten by SFI. In some cases, the BS 602 may be an example of the BS 102 illustrated in FIG. 1. Similarly, the UE 604 may be an example of the UE 104 illustrated in FIG. 1. Further, as shown, a Uu interface may be established to facilitate communication between the BS 602 and UE 604, however, in other aspects, a different type of interface may be used.

As illustrated, the operations 600 illustrated in FIG. 6 begin at 610 with the BS 602 transmitting, to the UE 604, a control message including semi-static scheduling configuration information. In some cases, the semi-static scheduling configuration information may indicate a plurality of configured grant (CG) symbols in which the UE 604 is scheduled to transmit at least one uplink transmission to the BS 602. In some cases, the CG symbols may comprise uplink symbols within a slot corresponding to CG occasions.

Thereafter, the BS 602 transmits an SFI message to the UE 604. In some cases, an SFI included within the SFI message may overwrite a subset of CG symbols of the plurality of CG symbols to be downlink symbols.

Thereafter, in block 630, the UE 604 takes one or more actions to communicate at least one downlink transmission. For example, as will be described in more detail below, in some cases, the UE 604 may decide to drop or not transmit at least one uplink transmission in the subset of CG symbols that were overwritten and instead receive the at least one downlink transmission. In other cases, the UE 604 may decide to transmit the at least one uplink transmission in the subset of CG symbols simultaneously with receiving the at least one downlink transmission using FD communication.

For example, in some cases, the UE 604 may receive a message scheduling the at least one downlink transmission in the downlink symbols (e.g., the subset of CG symbols that were overwritten to be downlink symbols). Thereafter, the UE 604 may determine whether a downlink receive beam for receiving the at least one downlink transmission is compatible with an uplink transmit beam for transmitting the at least one uplink transmission in the subset of CG symbols. In some cases, compatibility between the downlink receive beam and the uplink transmit beam may be defined in terms of self-interference at the UE (e.g., interference caused to downlink transmissions by the transmission of uplink transmissions). For example, a pair of beams (e.g., the downlink receive beam and the uplink transmit beam) that are compatible with each other may be defined as a pair of beams whose use (e.g., to transmit and receive transmissions) produces an amount of self-interference (e.g., measured by the UE) that is equal to or below a self-interference threshold. In other words, the downlink receive beam may be compatible with the uplink transmit beam when a self-interference between the downlink receive beam and the uplink transmit beam is less than or equal to the self-interference threshold. In contrast, a pair of beams that are not compatible with each other may be defined as a second pair of beams whose use produces an amount of self-interference that is greater than the self-interference threshold.

In some cases, the UE 604 may determine whether the downlink receive beam for receiving the at least one downlink transmission is compatible with the uplink transmit beam for transmitting the at least one uplink transmission in the subset of CG symbols based on at least one of a set of preconfigured candidate downlink and uplink beam pairs or beam management measurements indicating the self-interference between the downlink receive beam and the uplink transmit beam.

In some cases, the UE 604 may determine that the downlink receive beam for receiving the at least one downlink transmission is compatible with the uplink transmit beam for transmitting the at least one uplink transmission in the subset of CG symbols. In some cases, the downlink receive beam comprises a default downlink receive beam for receiving the at least one downlink transmission. In some cases, the downlink receive beam comprises another downlink receive beam for receiving the at least one downlink transmission that is indicated in the message scheduling the at least one downlink transmission.

In some cases, when the UE 604 determines that the downlink receive beam and the uplink transmit beam are compatible, taking the one or more actions in block 630 may include transmitting, as shown at 640, the at least one uplink transmission and simultaneously receiving the at least one downlink transmission, in the subset of CG symbols that were overwritten to be downlink symbols, using FD communication. For example, the UE 604 may use a first antenna panel of the UE 604 to receive the at least one downlink transmission via the downlink receive beam (e.g., default downlink receive beam) while simultaneously using a second antenna panel of the UE 604 to transmit the at least one uplink transmission via the uplink transmit beam.

In some cases, the UE 604 may determine that the downlink receive beam for receiving the at least one downlink transmission is not compatible with the uplink transmit beam for transmitting the at least one uplink transmission in the subset of CG symbols. In some cases, taking the one or more actions in block 630 may include not transmitting the at least one uplink transmission in the subset of CG symbols based on the determination that the downlink receive beam for receiving the at least one downlink transmission is not compatible with the uplink transmit beam for transmitting the at least one uplink transmission. In such cases, as shown at 650, the UE 604 may only communicate (e.g., receive) the at least one downlink transmission in the downlink symbols (e.g., the subset of CG symbols that were overwritten by the downlink symbols).

In other cases, when the at least one downlink transmission is not compatible with the uplink transmit beam, the UE 604 may switch to a default full-duplex beam pair in order to communicate the at least one downlink transmission simultaneously with the at least one uplink transmission, as explained further below. For example, in some cases, the UE 604 may receive, from the BS 602, an indication of a default full-duplex beam pair for simultaneously communicating the at least one downlink transmission and the at least one uplink transmission. In some cases, the UE may receive the indication of the default full-duplex beam pair in at least one of radio resource control (RRC) signaling, a media access control—control element (MAC-CE), or downlink control information (DCI). In some cases, the default full-duplex beam pair comprises a default downlink receive beam for receiving the at least one downlink transmission and a corresponding uplink transmit beam for transmitting the at least one downlink transmission that is compatible with the default downlink receive beam. In other words, the default full-duplex beam pair may include a pair of beams (e.g., uplink transmission beam and downlink receive beam) that are compatible with each other and that may be used simultaneously for receiving downlink transmissions and transmitting uplink transmissions without significant self-interference (e.g., not above the self-interference threshold).

Accordingly, when the UE 604 determines that the downlink receive beam and the uplink transmit beam are not compatible, taking the one or more actions in block 630 may include transmitting the at least one uplink transmission and receiving the at least one downlink transmission, in the subset of CG symbols that were overwritten to be downlink symbols, using full-duplex communication via the default full-duplex beam pair. In other words, as shown at 640, the UE 604 may use full-duplex communication to simultaneously transmit the at least one uplink transmission and receive the at least one downlink transmission via the default full-duplex beam pair.

For example, transmitting the at least one uplink transmission and receiving the at least one downlink transmission, in the subset of CG symbols that were overwritten to be downlink symbols, using full-duplex communication via the default full-duplex beam pair comprises using a first antenna panel of the UE 604 to receive the at least one downlink transmission via a default downlink receive beam of the default full-duplex beam pair. Additionally, the UE 604 may simultaneously use a second antenna panel of the UE 604 to transmit the at least one uplink transmission via a default uplink transmit beam of the default full-duplex beam pair.

In some cases, in order to simultaneously communicate the at least one downlink transmission and the at least one uplink transmission, the UE 604 may update the downlink receive beam, the uplink transmit beam, or both the downlink receive beam and the uplink transmit beam based on the default full-duplex beam pair. For example, in some cases, the UE 604 may determine that the uplink transmit beam for transmitting the at least one uplink transmission is different from a default uplink transmit beam of the default full-duplex beam pair. In some cases, the UE 604 may determine that the downlink receive beam is the same as the default downlink receive beam in the default full-duplex beam pair. In such cases, taking the one or more actions in block 630 may include updating only the uplink transmit beam for transmitting the at least one uplink transmission to the default uplink transmit beam. Thereafter, as shown at 640, the UE 604 may then transmit the at least one uplink transmissions using the updated default uplink transmit beam and simultaneously receive the at least downlink transmission using the downlink receive beam (e.g., which did not need to be updated since the downlink receive beam was the same as the default downlink receive beam indicated in the full-duplex beam pair).

In other cases, the UE 604 may determine that the downlink receive beam for receiving the at least one downlink transmission is different from a default downlink receive beam of the default full-duplex beam pair. In such cases, taking the one or more actions in block 630 may include updating the downlink transmit beam for receiving the at least one downlink transmission to the default uplink transmit beam. In some cases, the UE 604 may determine that the uplink transmit beam is the same as the default uplink transmit beam in the default full-duplex beam pair. In such cases, taking the one or more actions in block 630 may include updating only the downlink receive beam for receiving the at least one downlink transmission to the default downlink receive beam. Thereafter, as shown at 640, the UE 604 may then receive the at least one downlink transmission using the updated default downlink receive beam and simultaneously transmit the at least uplink transmission using the uplink transmit beam (e.g., which did not need to be updated since the uplink transmit beam was the same as the default uplink receive beam indicated in the full-duplex beam pair).

Additionally, in some cases, the UE 604 may determine that the downlink receive beam for receiving the at least one downlink transmission is different from a default downlink receive beam of the default full-duplex beam pair. The UE 604 may also determine that the uplink transmit beam for transmitting the at least one uplink transmission is different from a default uplink transmit beam of the default full-duplex beam pair. In such cases, taking the one or more actions in block 630 may include updating the downlink transmit beam for receiving the at least one downlink transmission to the default uplink transmit beam and updating the uplink transmit beam for transmitting the at least one uplink transmission to the default uplink transmit beam. The UE 604 may then receive the at least one downlink transmission using the updated default downlink receive beam while simultaneously transmitting the at least one uplink transmission using the updated default uplink transmit beam, as shown at 640.

Example Methods for Communicating Uplink and Downlink Transmissions When a Semi-Statically Configured Scheduling Occasion is Overwritten by an SFI FIG. 7 is a flow diagram illustrating example operations 700 for wireless communication, in accordance with certain aspects of the present disclosure. The operations 700 may be performed, for example, by a UE (e.g., such as the UE 104 in the wireless communication network 100 of FIG. 1) for communicating uplink and downlink transmissions when a semi-statically configured scheduling occasion is overwritten by an SFI. In some cases, the UE supports full-duplex communication for simultaneously transmitting at least one uplink transmission and receiving at least one downlink transmission. The operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 begin, at 710, receiving a control message from a base station (BS) activating a semi-static scheduling configuration, wherein the semi-static scheduling configuration indicates a plurality of configured grant (CG) symbols in which the UE is scheduled to transmit at least one uplink transmission to the BS.

In block 720, the UE receives, from the BS, a slot format indicator (SFI) that overwrites a subset of CG symbols of the plurality of CG symbols to be downlink symbols.

In block 730, the UE takes one or more actions to communicate at least one downlink transmission in the downlink symbols.

In some cases, operations 700 may further include receiving a message scheduling the at least one downlink transmission in the downlink symbols.

In some cases, operations 700 may further include determining whether a downlink receive beam for receiving the at least one downlink transmission is compatible with an uplink transmit beam for transmitting the at least one uplink transmission in the subset of CG symbols. In some cases, the downlink receive beam comprises one of: a default downlink receive beam for receiving the at least one downlink transmission, or another downlink receive beam for receiving the at least one downlink transmission that is indicated in the message scheduling the at least one downlink transmission.

In some cases, determining whether the downlink receive beam for receiving the at least one downlink transmission is compatible with the uplink transmit beam for transmitting the at least one uplink transmission in the subset of CG symbols is based on at least one of a set of preconfigured candidate downlink and uplink beam pairs or beam management measurements indicating the self-interference between the downlink receive beam and the uplink transmit beam.

In some cases, determining whether the downlink receive beam for receiving the at least one downlink transmission is compatible with an uplink transmit beam for transmitting the at least one uplink transmission in the subset of CG symbols comprises determining that the downlink receive beam is compatible with the uplink transmit beam. In such cases, taking the one or more actions in block 730 may include transmitting the at least one uplink transmission and receiving the at least one downlink transmission, in the subset of CG symbols that were overwritten to be downlink symbols, using full-duplex communication.

In some cases, transmitting the at least one uplink transmission and receiving the at least one downlink transmission, in the subset of CG symbols that were overwritten to be downlink symbols, using full-duplex communication comprises using a first antenna panel of the UE to receive the at least one downlink transmission via the downlink receive beam while simultaneously using a second antenna panel of the UE to transmit the at least one uplink transmission via the uplink transmit beam.

In some cases, determining whether a downlink receive beam for receiving the at least one downlink transmission is compatible with an uplink transmit beam for transmitting the at least one uplink transmission in the subset of CG symbols comprises determining that the downlink receive beam is not compatible with the uplink transmit beam.

In some cases, taking the one or more actions in block 730 comprises not transmitting the at least one uplink transmission in the subset of CG symbols based on the determination that the downlink receive beam for receiving the at least one downlink transmission is not compatible with the uplink transmit beam for transmitting the at least one uplink transmission.

In some cases, operations 700 may further include receiving an indication of a default full-duplex beam pair for simultaneously communicating the at least one downlink transmission and the at least one uplink transmission. In some cases, receiving the indication of the default full-duplex beam pair includes receiving the indication of the default full-duplex beam pair in at least one of radio resource control (RRC) signaling, a media access control—control element (MAC-CE), or downlink control information (DCI). In some cases, the default full-duplex beam pair comprises a default downlink receive beam for receiving the at least one downlink transmission and a corresponding uplink transmit beam for transmitting the at least one downlink transmission that is compatible with the default downlink receive beam.

In some cases, taking the one or more actions in block 730 comprises transmitting the at least one uplink transmission and receiving the at least one downlink transmission, in the subset of CG symbols that were overwritten to be downlink symbols, using full-duplex communication via the default full-duplex beam pair. In some cases, transmitting the at least one uplink transmission and receiving the at least one downlink transmission, in the subset of CG symbols that were overwritten to be downlink symbols, using full-duplex communication via the default full-duplex beam pair comprises simultaneously: using a first antenna panel of the UE to receive the at least one downlink transmission via a default downlink receive beam of the default full-duplex beam pair, and using a second antenna panel of the UE to transmit the at least one uplink transmission via a default uplink transmit beam of the default full-duplex beam pair.

In some cases, operations 700 may further include determining that an uplink transmit beam for transmitting the at least one uplink transmission is different from a default uplink transmit beam of the default full-duplex beam pair. In some cases, taking the one or more actions in block 730 may include updating the uplink transmit beam for transmitting the at least one uplink transmission to the default uplink transmit beam.

In some cases, operations 700 may further include determining that a downlink receive beam for receiving the at least one downlink transmission is different from a default downlink receive beam of the default full-duplex beam pair. In some cases, taking the one or more actions in block 730 may include updating the downlink transmit beam for receiving the at least one downlink transmission to the default uplink transmit beam.

FIG. 8 is a flow diagram illustrating example operations 800 for wireless communication. The operations 800 may be performed, for example, by a BS (e.g., such as the BS 102 in the wireless communication network 100 of FIG. 1) for communicating uplink and downlink transmissions when a semi-statically configured scheduling occasion is overwritten by an SFI. The operations 800 may be complementary to the operations 700 performed by the UE in FIG. 7. The operations 800 may be implemented as software components that are executed and run on one or more processors (e.g., controller/processor 240 of FIG. 2). Further, the transmission and reception of signals by the BS in operations 800 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 800 begin, at 810, with transmitting a control message to a user equipment (UE) activating a semi-static scheduling configuration, wherein the semi-static scheduling configuration indicates a plurality of configured grant (CG) symbols in which the UE is scheduled to transmit at least one uplink transmission to the BS.

In block 820, the BS transmits, to the UE, a slot format indicator (SFI) that overwrites a subset of CG symbols of the plurality of CG symbols to be downlink symbols at the UE.

In block 830, the BS communicates at least one downlink transmission in the downlink symbols.

In some cases, operations 800 may further include transmitting a message scheduling the at least one downlink transmission in the downlink symbols.

In some cases, the downlink receive beam comprises one of: a default downlink receive beam for receiving the at least one downlink transmission, or another downlink receive beam for receiving the at least one downlink transmission that is indicated in the message scheduling the at least one downlink transmission.

In some cases, when a downlink receive beam for receiving the at least one downlink transmission is compatible with an uplink transmit beam for transmitting the at least one uplink transmission in the subset of CG symbols, communicating the at least one downlink transmission in the downlink symbols in block 830 comprises receiving the at least one uplink transmission and transmitting the at least one downlink transmission using full-duplex communication.

In some cases, when a downlink receive beam for receiving the at least one downlink transmission is compatible with an uplink transmit beam for transmitting the at least one uplink transmission in the subset of CG symbols, communicating the at least one downlink transmission in the downlink symbols in block 830 comprises transmitting the at least one downlink transmission in the downlink symbols and not receiving the at least one uplink transmission in the subset of CG symbols that were overwritten by the downlink symbols.

In some cases, when a downlink receive beam for receiving the at least one downlink transmission is not compatible with an uplink transmit beam for transmitting the at least one uplink transmission in the subset of CG symbols, communicating at least one downlink transmission in the downlink symbols in block 830 comprises receiving the at least one uplink transmission and transmitting the at least one downlink transmission using full-duplex communication based on a default full-duplex bear pair.

In some cases, operations 800 further include transmitting an indication of the default full-duplex beam pair for simultaneously communicating the at least one downlink transmission and the at least one uplink transmission. In some cases, transmitting the indication of the full-duplex beam pair comprises transmitting the indication of the default full-duplex beam pair in at least one of radio resource control (RRC) signaling, a media access control—control element (MAC-CE), or downlink control information (DCI).

In some cases, the default full-duplex beam pair comprises a default downlink receive beam for receiving the at least one downlink transmission and a corresponding uplink transmit beam for transmitting the at least one downlink transmission that is compatible with the default downlink receive beam.

Example Wireless Communication Devices

Figure 9:
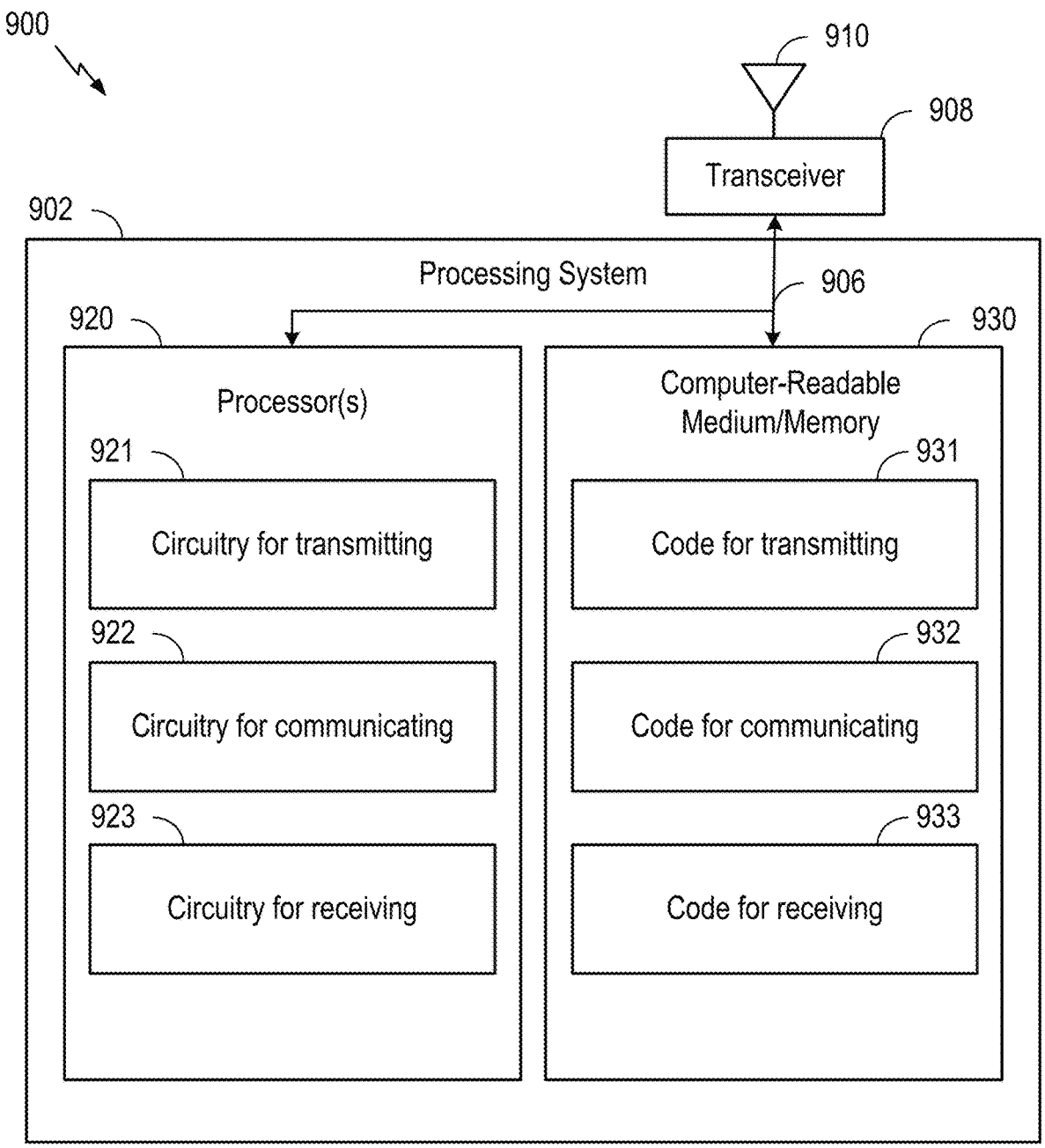
FIG. 9 depicts aspects of an example communications device.

FIG. 9 depicts an example communication device 900 that includes various components operable, configured, or adapted to perform operations for the techniques disclosed herein, such as the operations depicted and described with respect to FIGS. 6 and 8. In some examples, communication device 900 may be a BS 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 6 and 8, or other operations for performing the various techniques discussed herein for communicating uplink and downlink transmissions when a semi-statically configured scheduling occasion is overwritten by an SFI.

In the depicted example, computer-readable medium/memory 930 stores code 931 for transmitting, code 932 for communicating, and code 933 for receiving.

In the depicted example, the one or more processors 920 include circuitry configured to implement the code stored in the computer-readable medium/memory 930, including circuitry 921 for transmitting, circuitry 922 for communicating, and circuitry 923 for receiving.

Various components of communications device 900 may provide means for performing the methods described herein, including with respect to FIGS. 6 and 8.

In some examples, means for transmitting or sending (or means for outputting for transmission), as well as means for communicating, may include the transceivers 232 and/or antenna(s) 234 of the BS 102 illustrated in FIG. 2 and/or transceiver 908 and antenna 910 of the communication device 900 in FIG. 9.

In some examples, means for receiving (or means for obtaining), as well as means for communicating, may include the transceivers 232 and/or antenna(s) 234 of the base station illustrated in FIG. 2 and/or transceiver 908 and antenna 910 of the communication device 900 in FIG. 9.

Notably, FIG. 9 is an example, and many other examples and configurations of communication device 900 are possible.

Figure 10:
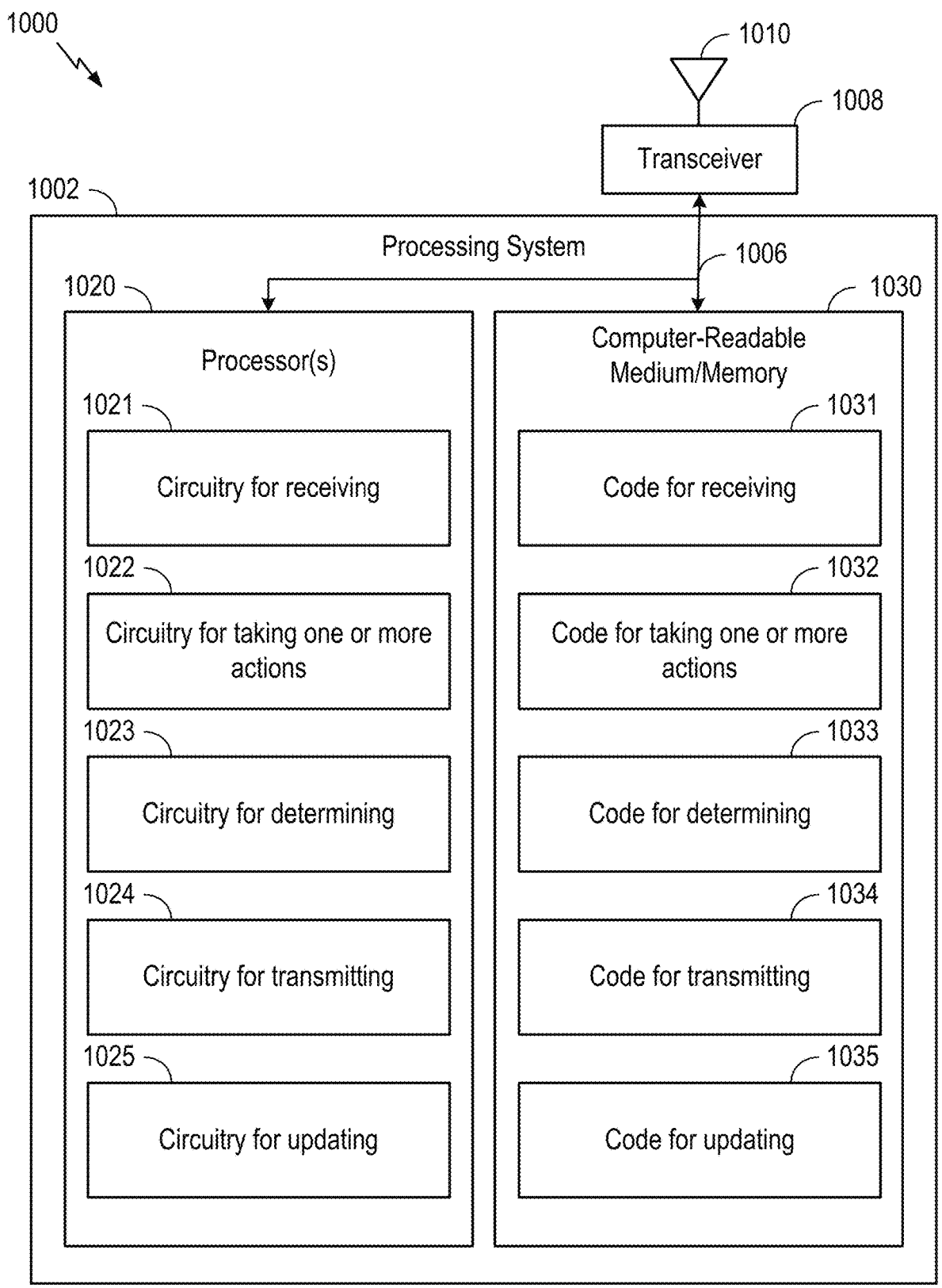
FIG. 10 depicts aspects of an example communications device.

FIG. 10 depicts an example communication device 1000 that includes various components operable, configured, or adapted to perform operations for the techniques disclosed herein, such as the operations depicted and described with respect to FIGS. 6-7. In some examples, communication device 1000 may be a UE 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIGS. 6-7, or other operations for performing the various techniques discussed herein for communicating uplink and downlink transmissions when a semi-statically configured scheduling occasion is overwritten by an SFI.

In the depicted example, computer-readable medium/memory 1030 stores code 1031 for receiving, code 1032 for taking one or more actions, code 1033 for determining, code 1034 for transmitting, and code 1035 for updating.

In the depicted example, the one or more processors 1020 include circuitry configured to implement the code stored in the computer-readable medium/memory 1030, including circuitry 1021 for receiving, circuitry 1022 for taking one or more actions, circuitry 1023 for determining, circuitry 1024 for transmitting, and circuitry 1025 for updating.

Various components of communications device 1000 may provide means for performing the methods described herein, including with respect to FIGS. 6-7.

In some examples, means for transmitting (or means for outputting for transmission) may include the transceivers 254 and/or antenna(s) 252 of the UE 104 illustrated in FIG. 2 and/or transceiver 1008 and antenna 1010 of the communication device 1000 in FIG. 10.

In some examples, means for receiving (or means for obtaining) may include the transceivers 254 and/or antenna(s) 252 of the UE 104 illustrated in FIG. 2 and/or transceiver 1008 and antenna 1010 of the communication device 1000 in FIG. 10.

In some examples, means for determining and means for updating include various processing system components, such as: the one or more processors 1020 in FIG. 10, or aspects of the UE 104 depicted in FIG. 2, including receive processor 258, transmit processor 264, TX MIMO processor 266, and/or controller/processor 280 (including FD communication component 281).

Notably, FIG. 10 is an example, and many other examples and configurations of communication device 1000 are possible.

Example Clauses

Implementation examples are described in the following numbered clauses:

Clause 1: A method for wireless communication by a user equipment (UE), comprising: receiving a control message from a base station (BS) activating a semi-static scheduling configuration, wherein the semi-static scheduling configuration indicates a plurality of configured grant (CG) symbols in which the UE is scheduled to transmit at least one uplink transmission to the BS; receiving, from the BS, a slot format indicator (SFI) that overwrites a subset of CG symbols of the plurality of CG symbols to be downlink symbols; and taking one or more actions to communicate at least one downlink transmission in the downlink symbols.

Clause 2: The method of Clause 1, further comprising: receiving a message scheduling the at least one downlink transmission in the downlink symbols; and determining whether a downlink receive beam for receiving the at least one downlink transmission is compatible with an uplink transmit beam for transmitting the at least one uplink transmission in the subset of CG symbols, wherein the downlink receive beam is compatible with the uplink transmit beam when a self-interference between the downlink receive beam and the uplink transmit beam is less than or equal to a threshold.

Clause 3: The method of Clause 2, wherein the downlink receive beam comprises one of: a default downlink receive beam for receiving the at least one downlink transmission, or another downlink receive beam for receiving the at least one downlink transmission that is indicated in the message scheduling the at least one downlink transmission.

Clause 4: The method of any one of Clauses 2-3, wherein determining whether the downlink receive beam for receiving the at least one downlink transmission is compatible with the uplink transmit beam for transmitting the at least one uplink transmission in the subset of CG symbols is based on at least one of a set of preconfigured candidate downlink and uplink beam pairs or beam management measurements indicating the self-interference between the downlink receive beam and the uplink transmit beam.

Clause 5: The method of any one of Clauses 2-4, wherein: determining whether the downlink receive beam for receiving the at least one downlink transmission is compatible with an uplink transmit beam for transmitting the at least one uplink transmission in the subset of CG symbols comprises determining that the downlink receive beam is compatible with the uplink transmit beam, and taking the one or more actions comprises transmitting the at least one uplink transmission and receiving the at least one downlink transmission, in the subset of CG symbols that were overwritten to be downlink symbols, using full-duplex communication.

Clause 6: The method of Clause 5, wherein transmitting the at least one uplink transmission and receiving the at least one downlink transmission, in the subset of CG symbols that were overwritten to be downlink symbols, using full-duplex communication comprises using a first antenna panel of the UE to receive the at least one downlink transmission via the downlink receive beam while simultaneously using a second antenna panel of the UE to transmit the at least one uplink transmission via the uplink transmit beam.

Clause 7: The method of any one of Clauses 2-4, wherein determining whether a downlink receive beam for receiving the at least one downlink transmission is compatible with an uplink transmit beam for transmitting the at least one uplink transmission in the subset of CG symbols comprises determining that the downlink receive beam is not compatible with the uplink transmit beam.

Clause 8: The method of Clause 7, wherein taking the one or more actions comprises not transmitting the at least one uplink transmission in the subset of CG symbols based on the determination that the downlink receive beam for receiving the at least one downlink transmission is not compatible with the uplink transmit beam for transmitting the at least one uplink transmission.

Clause 9: The method of Clause 7, further comprising receiving an indication of a default full-duplex beam pair for simultaneously communicating the at least one downlink transmission and the at least one uplink transmission.

Clause 10: The method of Clause 9, further comprising receiving the indication of the default full-duplex beam pair in at least one of radio resource control (RRC) signaling, a media access control—control element (MAC-CE), or downlink control information (DCI).

Clause 11: The method of any one of Clauses 9-10, wherein the default full-duplex beam pair comprises a default downlink receive beam for receiving the at least one downlink transmission and a corresponding uplink transmit beam for transmitting the at least one downlink transmission that is compatible with the default downlink receive beam.

Clause 12: The method of any one of Clauses 9-11, wherein taking the one or more actions comprises transmitting the at least one uplink transmission and receiving the at least one downlink transmission, in the subset of CG symbols that were overwritten to be downlink symbols, using full-duplex communication via the default full-duplex beam pair.

Clause 13: The method of Clause 12, wherein transmitting the at least one uplink transmission and receiving the at least one downlink transmission, in the subset of CG symbols that were overwritten to be downlink symbols, using full-duplex communication via the default full-duplex beam pair comprises simultaneously: using a first antenna panel of the UE to receive the at least one downlink transmission via a default downlink receive beam of the default full-duplex beam pair, and using a second antenna panel of the UE to transmit the at least one uplink transmission via a default uplink transmit beam of the default full-duplex beam pair.

Clause 14: The method of Clause 13, further comprising: determining that an uplink transmit beam for transmitting the at least one uplink transmission is different from a default uplink transmit beam of the default full-duplex beam pair; and updating the uplink transmit beam for transmitting the at least one uplink transmission to the default uplink transmit beam.

Clause 15: The method of any one of Clauses 13-14, further comprising: determining that a downlink receive beam for receiving the at least one downlink transmission is different from a default downlink receive beam of the default full-duplex beam pair; and updating the downlink transmit beam for receiving the at least one downlink transmission to the default uplink transmit beam.

Clause 16: The method of any one of Clauses 1-15, wherein the UE supports full-duplex communication for simultaneously transmitting the at least one uplink transmission and receiving the at least one downlink transmission.

Clause 17: A method for wireless communication by a base station (BS), comprising: transmitting a control message to a user equipment (UE) activating a semi-static scheduling configuration, wherein the semi-static scheduling configuration indicates a plurality of configured grant (CG) symbols in which the UE is scheduled to transmit at least one uplink transmission to the BS; transmitting, to the UE, a slot format indicator (SFI) that overwrites a subset of CG symbols of the plurality of CG symbols to be downlink symbols; and communicating at least one downlink transmission in the downlink symbols.

Clause 18: The method of Clause 17, further comprising transmitting a message scheduling the at least one downlink transmission in the downlink symbols.

Clause 19: The method of any one of Clauses 17-18, wherein, when a downlink receive beam for receiving the at least one downlink transmission is compatible with an uplink transmit beam for transmitting the at least one uplink transmission in the subset of CG symbols, communicating at least one downlink transmission in the downlink symbols comprises receiving the at least one uplink transmission and transmitting the at least one downlink transmission using full-duplex communication.

Clause 20: The method of any one of Clauses 17-18, wherein, when a downlink receive beam for receiving the at least one downlink transmission is compatible with an uplink transmit beam for transmitting the at least one uplink transmission in the subset of CG symbols, communicating the at least one downlink transmission in the downlink symbols comprises transmitting the at least one downlink transmission in the downlink symbols and not receiving the at least one uplink transmission in the subset of CG symbols that were overwritten by the downlink symbols.

Clause 21: The method of any one of Clauses 17-18, wherein, when a downlink receive beam for receiving the at least one downlink transmission is not compatible with an uplink transmit beam for transmitting the at least one uplink transmission in the subset of CG symbols, communicating at least one downlink transmission in the downlink symbols comprises receiving the at least one uplink transmission and transmitting the at least one downlink transmission using full-duplex communication based on a default full-duplex beam pair.

Clause 22: The method of any one of Clauses 19-21, wherein the downlink receive beam comprises one of: a default downlink receive beam for receiving the at least one downlink transmission, or another downlink receive beam for receiving the at least one downlink transmission that is indicated in a message scheduling the at least one downlink transmission Clause 23: The method of Clause 22, further comprising transmitting an indication of the default full-duplex beam pair for simultaneously communicating the at least one downlink transmission and the at least one uplink transmission.

Clause 24: The method of Clause 23, wherein transmitting the indication of the default full-duplex beam pair comprises transmitting the indication of the default full-duplex beam pair in at least one of radio resource control (RRC) signaling, a media access control—control element (MAC-CE), or downlink control information (DCI).

Clause 25: The method of any one of Clauses 23-24, wherein the default full-duplex beam pair comprises a default downlink receive beam for receiving the at least one downlink transmission and a corresponding uplink transmit beam for transmitting the at least one downlink transmission that is compatible with the default downlink receive beam.

Clause 26: An apparatus, comprising: a memory comprising executable instructions; one or more processors configured to execute the executable instructions and cause the apparatus to perform a method in accordance with any one of Clauses 1-25.

Clause 27: An apparatus, comprising means for performing a method in accordance with any one of Clauses 1-25.

Clause 28: A non-transitory computer-readable medium comprising executable instructions that, when executed by one or more processors of an apparatus, cause the apparatus to perform a method in accordance with any one of Clauses 1-25.

Clause 29: A computer program product embodied on a computer-readable storage medium comprising code for performing a method in accordance with any one of Clauses 1-25.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as base station 180 may operate in a traditional sub-6 GHz spectrum, in millimeter wave (mmWave) frequencies, and/or near mmWave frequencies in communication with the UE 104. When the base station 180 operates in mmWave or near mmWave frequencies, the base station 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of communicating uplink and downlink transmissions when a semi-statically configured scheduling occasion is overwritten by an SFI in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication comprising:
a memory comprising executable instructions; and
one or more processors configured to execute the executable instructions and cause a user equipment (UE) to:
receive a control message, from a base station (BS), that activates a semi-static scheduling configuration, wherein the semi-static scheduling configuration indicates a plurality of configured grant (CG) symbols in which the UE is scheduled to transmit at least one uplink transmission to the BS;
receive, from the BS, a slot format indicator (SFI) that overwrites a subset of CG symbols of the plurality of CG symbols to be downlink symbols;
take one or more actions for to communication of at least one downlink transmission in the downlink symbols; and
receive an indication of a default full-duplex beam pair for simultaneously communicating the at least one downlink transmission and the at least one uplink transmission.

2. The apparatus of claim 1, wherein the one or more processors are configured to execute the executable instructions and cause the UE to:
receive a message scheduling the at least one downlink transmission in the downlink symbols; and
determine whether a downlink receive beam for reception of the at least one downlink transmission is compatible with an uplink transmit beam for transmittion of the at least one uplink transmission in the subset of CG symbols, wherein the downlink receive beam is compatible with the uplink transmit beam when a self-interference between the downlink receive beam and the uplink transmit beam is less than or equal to a threshold.

3. The apparatus of claim 2, wherein the downlink receive beam comprises one of:
a default downlink receive beam for reception of the at least one downlink transmission, or
another downlink receive beam for reception of the at least one downlink transmission that is indicated in the message scheduling the at least one downlink transmission.

4. The apparatus of claim 2, wherein determination whether the downlink receive beam for reception of the at least one downlink transmission is compatible with the uplink transmit beam for transmission of the at least one uplink transmission in the subset of CG symbols is based on at least one of a set of preconfigured candidate downlink and uplink beam pairs or beam management measurements indicating the self-interference between the downlink receive beam and the uplink transmit beam.

5. The apparatus of claim 2, wherein:
to determine whether the downlink receive beam for reception of the at least one downlink transmission is compatible with an uplink transmit beam for transmission of the at least one uplink transmission in the subset of CG symbols, the one or more processors are configured to execute the executable instructions and cause the UE to transmit the at least one uplink transmission and receive the at least one downlink transmission, in the subset of CG symbols that were overwritten to be downlink symbols, using full-duplex communication.

6. The apparatus of claim 5, wherein to transmit the at least one uplink transmission and receive the at least one downlink transmission, in the subset of CG symbols that were overwritten to be downlink symbols, using full-duplex communication the one or more processors are configured to execute the executable instructions and cause the UE to use a first antenna panel of the UE to receive the at least one downlink transmission via the downlink receive beam and simultaneously use a second antenna panel of the UE to transmit the at least one uplink transmission via the uplink transmit beam.

7. The apparatus of claim 2, wherein to determine whether a downlink receive beam for reception of the at least one downlink transmission is compatible with an uplink transmit beam for transmission of the at least one uplink transmission in the subset of CG symbols, the one or more processors are configured to execute the executable instructions and cause the UE to determine that the downlink receive beam is not compatible with the uplink transmit beam.

8. The apparatus of claim 7, wherein to take the one or more actions, the one or more processors are configured to execute the executable instructions and cause the UE to not transmit the at least one uplink transmission in the subset of CG symbols based on the determination that the downlink receive beam for reception of the at least one downlink transmission is not compatible with the uplink transmit beam for transmission of the at least one uplink transmission.

9. The apparatus of claim 1, wherein the one or more processors are configured to execute the executable instructions and cause the UE to receive the indication of the default full-duplex beam pair in at least one of radio resource control (RRC) signaling, a media access control—control element (MAC-CE), or downlink control information (DCI).

10. The apparatus of claim 1, wherein the default full-duplex beam pair comprises a default downlink receive beam for reception of the at least one downlink transmission and a corresponding uplink transmit beam for transmission of the at least one downlink transmission that is compatible with the default downlink receive beam.

11. The apparatus of claim 1, wherein to take the one or more actions, the one or more processors are configured to execute the executable instructions and cause the UE to transmit the at least one uplink transmission and receive the at least one downlink transmission, in the subset of CG symbols that were overwritten to be downlink symbols, using full-duplex communication via the default full-duplex beam pair.

12. The apparatus of claim 11, wherein to transmit the at least one uplink transmission and receive the at least one downlink transmission, in the subset of CG symbols that were overwritten to be downlink symbols, using full-duplex communication via the default full-duplex beam pair, the one or more processors are configured to execute the executable instructions and cause the UE to simultaneously:
use a first antenna panel of the UE to receive the at least one downlink transmission via a default downlink receive beam of the default full-duplex beam pair, and
use a second antenna panel of the UE to transmit the at least one uplink transmission via a default uplink transmit beam of the default full-duplex beam pair.

13. The apparatus of claim 12, wherein the one or more processors are configured to execute the executable instructions and cause the UE to:
determine that an uplink transmit beam for transmission of the at least one uplink transmission is different from a default uplink transmit beam of the default full-duplex beam pair; and
update the uplink transmit beam for transmission of the at least one uplink transmission to the default uplink transmit beam.

14. The apparatus of claim 12, wherein the one or more processors are configured to execute the executable instructions and cause the UE to:
determine that a downlink receive beam for reception of the at least one downlink transmission is different from a default downlink receive beam of the default full-duplex beam pair, and
update the downlink transmit beam for reception of the at least one downlink transmission to the default uplink transmit beam.

15. The apparatus of claim 1, wherein the UE supports full-duplex communication for simultaneous transmission of the at least one uplink transmission and reception of the at least one downlink transmission.

16. An apparatus for wireless communication, comprising:
a memory comprising executable instructions; and
one or more processors configured to execute the executable instructions and cause a base station (BS) to:
transmit a control message; to a user equipment (UE); that activates a semi-static scheduling configuration, wherein the semi-static scheduling configuration indicates a plurality of configured grant (CG) symbols in which the UE is scheduled to transmit at least one uplink transmission to the BS;
transmit, to the UE, a slot format indicator (SFI) that overwrites a subset of CG symbols of the plurality of CG symbols to be downlink symbols; and
communicate at least one downlink transmission in the downlink symbols,
wherein, when a downlink receive beam for reception of the at least one downlink transmission is not compatible with an uplink transmit beam for transmission of the at least one uplink transmission in the subset of CG symbols, to communicate at least one downlink transmission in the downlink symbols, the one or more processors are configured to execute the executable instructions and cause the BS to receive the at least one uplink transmission and transmit the at least one downlink transmission using full-duplex communication based on a default full-duplex beam pair.

17. The apparatus of claim 16, wherein the one or more processors are configured to execute the executable instructions and cause the BS to transmit a message scheduling the at least one downlink transmission in the downlink symbols.

18. The apparatus of claim 16, wherein the downlink receive beam comprises one of:
a default downlink receive beam for the at least one downlink transmission, or
another downlink receive beam for the at least one downlink transmission that is indicated in a message scheduling the at least one downlink transmission.

19. The apparatus of claim 18, wherein the one or more processors are configured to execute the executable instructions and cause the BS to transmit an indication of the default full-duplex beam pair for simultaneous communication of the at least one downlink transmission and the at least one uplink transmission.

20. The apparatus of claim 19, wherein to transmit the indication of the default full-duplex beam pair, wherein the one or more processors are configured to execute the executable instructions and cause the BS to transmit the indication of the default full-duplex beam pair in at least one of radio resource control (RRC) signaling, a media access control—control element (MAC-CE), or downlink control information (DCI).

21. The apparatus of claim 19, wherein the default full-duplex beam pair comprises a default downlink receive beam for reception of the at least one downlink transmission and a corresponding uplink transmit beam for transmission of the at least one downlink transmission that is compatible with the default downlink receive beam.

22. A method for wireless communication by a user equipment (UE), comprising:
receiving a control message from a base station (BS) that activates a semi-static scheduling configuration, wherein the semi-static scheduling configuration indicates a plurality of configured grant (CG) symbols in which the apparatus is scheduled to transmit at least one uplink transmission to the BS;

receiving, from the BS, a slot format indicator (SFI) that overwrites a subset of CG symbols of the plurality of CG symbols to be downlink symbols;

taking one or more actions for communication of at least one downlink transmission in the downlink symbols; and receiving an indication of a default full-duplex beam pair for simultaneously communicating the at least one downlink transmission and the at least one unlink transmission.

\* \* \* \* \*